US012689889B2

(12) United States Patent
Dong

(10) Patent No.: US 12,689,889 B2
(45) Date of Patent: Jul. 21, 2026

(54) INFORMATION TRANSMISSION METHODS AND APPARATUSES

(71) Applicant: Beijing Xiaomi Mobile Software Co., Ltd., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 276 days.

(21) Appl. No.: 18/560,855

(22) PCT Filed: May 18, 2021

(86) PCT No.: PCT/CN2021/094372
§ 371 (c)(1),
(2) Date: Nov. 14, 2023

(87) PCT Pub. No.: WO2022/241641
PCT Pub. Date: Nov. 24, 2022

(65) Prior Publication Data
US 2024/0284163 A1 Aug. 22, 2024

(51) Int. Cl.
*H04W 8/22* (2009.01)
*H04W 28/20* (2009.01)
*H04W 84/12* (2009.01)

(52) U.S. Cl.
CPC ............. *H04W 8/22* (2013.01); *H04W 28/20* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2016/0128024 A1 | 5/2016 | Frederiks et al. | |
| 2016/0255660 A1 | 9/2016 | Son et al. | |
| 2017/0134928 A1* | 5/2017 | Eitan ................... | H04L 25/0224 |
| 2020/0128524 A1 | 4/2020 | Han et al. | |
| 2020/0221545 A1 | 7/2020 | Stacey et al. | |
| 2021/0111935 A1 | 4/2021 | Chen et al. | |
| 2021/0266905 A1 | 8/2021 | Chen et al. | |

FOREIGN PATENT DOCUMENTS

| | | |
|---|---|---|
| CN | 105981310 A | 9/2016 |
| CN | 109121206 A | 1/2019 |
| CN | 112469088 A | 3/2021 |
| CN | 112753185 A | 5/2021 |

(Continued)

OTHER PUBLICATIONS

ISA State Intellectual Property Office of the People's Republic of China, International Search Report Issued in Application No. PCT/CN2022/131747, Jul. 4, 2023, WIPO, 4 pages.

(Continued)

*Primary Examiner* — Anh Ngoc M Nguyen
(74) *Attorney, Agent, or Firm* — Volpe Koenig

(57) ABSTRACT

The present disclosure provides communication methods and apparatuses. In an aspect, a communication method includes: determining a first message frame, where the first message frame includes information for identifying a support capability for transmitting and/or receiving an aggregated physical (PHY) protocol data unit (A-PPDU); and transmitting the first message frame.

18 Claims, 2 Drawing Sheets

(56) References Cited

FOREIGN PATENT DOCUMENTS

| CN | 115243325 A | 10/2022 |
| WO | 2020/096895 A1 | 5/2020 |
| WO | 2021045341 A1 | 3/2021 |
| WO | 2021066283 A1 | 4/2021 |

OTHER PUBLICATIONS

ISA State Intellectual Property Office of the People's Republic of China, International Search Report Issued in Application No. PCT/CN2022/126501, Jul. 3, 2023, WIPO, 4 pages.

State Intellectual Property Office of the People's Republic of China, Office Action and Search Report Issued in Application No. 2021800014642, Sep. 13, 2024, 15 pages. (Submitted with Machine/Partial Translation).

ISA State Intellectual Property Office of the People's Republic of China, Written Opinion of the International Searching Authority Issued in Application No. PCT/CN2021/094372, Feb. 17, 2022, WIPO, 6 pages.

European Patent Office, Extended European Search Report Issued in Application No. 21940098.3, Feb. 25, 2025, Germany, 9 pages.

Chenchen Liu et al: "EHT NDP A Frame Design Discussion", IEEE 802.11-20/1015r0, XP068170125, Jul. 2020, 24 pages.

ISA State Intellectual Property Office of the People's Republic of China, International Search Report Issued in Application No. PCT/CN2021/094372, Feb. 17, 2022, WIPO, 4 pages.

IEEE Computer Society "Part 11: Wireless LAN Medium Access Control (MAC) and Physical Layer (PHY) Specifications""ANSI/IEEE Std 802.11, 1999 Edition" Aug. 20, 1999, 528 pages.

Indian Office Action issued on Apr. 7, 2026 for Indian Patent Application No. 202317084781.

IEEE 802.11be-2024, IEEE 802.11be (Wi-Fi 7) Extremely High Throughput (EHT) standard-general overview, Multi-Link Operation (MLO) in Wi-Fi 7, including AP MLD and non-AP STA MLD architecture, common general knowledge, wikipedia, 6 pages.

* cited by examiner

AP

STA1

STA2

STA3

AP MLD                         non-AP STA MLD

AP1    ←——— Link 1 ———→    STA1

AP2    ←——— Link 2 ———→    STA2

AP3    ←——— Link 3 ———→    STA3

INFORMATION TRANSMISSION METHODS AND APPARATUSES

CROSS REFERENCE TO RELATED APPLICATIONS

This application is a U.S. national phase application of International Application No. PCT/CN2021/094372, filed on May 18, 2021, the disclosure of which is incorporated herein by reference in its entirety for all purposes.

BACKGROUND

The current research scope of Wireless Fidelity (Wi-Fi) technology includes bandwidth transmission of 320 MHz, aggregation and cooperation of a plurality of frequency bands, etc. It is expected to improve the rate and throughput by at least four times compared to existing standards, and the main application scenarios include video transmission, augmented reality (AR), virtual reality (VR), etc.

The aggregation and cooperation of the plurality of frequency bands means that communication is performed between devices under frequency bands of 2.4 GHz, 5 GHZ, and 6 GHz at the same time. For communication performed between devices under the plurality of frequency bands at the same time, a new media access control (MAC) mechanism needs to be defined for management. In addition, it is expected that low-latency transmission can be supported by the aggregation and coordination of the plurality of frequency bands.

At present, the maximum bandwidth supported by the aggregation and cooperation of the plurality of frequency bands is 320 MHz (160 MHz+160 MHz). In addition, 240 MHz (160 MHz+80 MHz) and other bandwidths may also be supported.

In current technology, a station (STA) and an access point (AP) can be multi-link devices (MLDs), i.e., a function of simultaneously transmitting and/or receiving under multiple links at the same time is supported. Therefore, in current technology, there can be multiple links between the STA and the AP, and the research on the communication between these two devices under multiple links is underway.

SUMMARY

The present disclosure relates to the field of wireless communication, and in particular to communication methods and communication apparatuses.

According to the first embodiment of the present disclosure, there is provided a communication method, including: determining a first message frame, where the first message frame includes information for identifying a support capability for transmitting and/or receiving an aggregated physical (PHY) protocol data unit (A-PPDU); and transmitting the first message frame.

According to the second embodiment of the present disclosure, there is provided another communication method, including: receiving a first message frame, where the first message frame includes information for identifying a support capability for transmitting and/or receiving an aggregated physical (PHY) protocol data unit (A-PPDU); and performing a communication operation based on the first message frame.

According to the third embodiment of the present disclosure, there is provided a communication apparatus, including: a processing module, configured to determine a first message frame, where the first message frame includes information for identifying a support capability for transmitting and/or receiving an aggregated physical (PHY) protocol data unit (A-PPDU); and a transceiver module, configured to transmit the first message frame.

According to the fourth embodiment of the present disclosure, there is provided another communication apparatus, including: a transceiver module, configured to receive a first message frame, where the first message frame includes information for identifying a support capability for transmitting and/or receiving an aggregated physical (PHY) protocol data unit (A-PPDU); and a processing module, configured to control, based on the first message frame, performing of a communication operation.

According to the fifth embodiment of the present disclosure, there is provided an electronic device is provided. The electronic device includes a memory, a processor, and a computer program stored in the memory and executable on the processor. The methods described above are implemented when the computer program is executed by the processor.

According to the sixth embodiment of the present disclosure, there is provided a computer-readable storage medium storing a computer program. The methods described above are implemented when the computer program is executed by the processor.

BRIEF DESCRIPTION OF THE DRAWINGS

The above and other features of embodiments of the present disclosure will be more apparent by describing in detail exemplary embodiments of the present disclosure with reference to the accompanying drawings, in which.

DETAILED DESCRIPTION OF THE EMBODIMENTS

The following description, with reference to the accompanying drawings, is provided to help a comprehensive understanding of various embodiments of the present disclosure as defined by the appended claims and their equivalents. Various embodiments of the present disclosure include various specific details, which are to be considered as exemplary only. In addition, for clarity and conciseness, descriptions of well-known technologies, functions, and configurations can be omitted.

The terms and words used in the present disclosure are not limited to written meanings, but are only used by the inventor to enable a clear and consistent understanding of the present disclosure. Therefore, for those skilled in the art, the description of various embodiments in the present disclosure is provided for the purpose of illustration only, and not for limitation.

It should be understood that singular forms "a/an", "one", "the", and "said" used herein can also include the plural forms unless the context clearly indicates otherwise. It should be further understood that the term "including" used in the present disclosure refers to the presence of described features, integers, steps, operations, and/or components, but does not exclude the presence or addition of one or more other features, integers, steps, operations, components, and/or groups thereof.

It will be understood that although terms "first", "second", and the like can be used herein to describe various elements, these elements should not be limited by these terms. These terms are only used to distinguish one element from another. Therefore, without departing from the teachings of the exemplary embodiments, the first element discussed below can be referred to as the second element.

It should be understood that when a component is referred to as "connected" or "coupled" to another component, it can be directly connected or coupled to other components, or there can also be intermediate components. In addition, "connected" or "coupled" used herein can include wireless connected or wireless coupled. The term "and/or" or the expression "at least one of . . . " used herein includes any and all combinations of one or more related listed items.

Unless otherwise defined, all terms used herein (including technical terms and scientific terms) have the same meaning as those generally understood by ordinary technicians in the field to which the present disclosure belongs.

Figure 1:
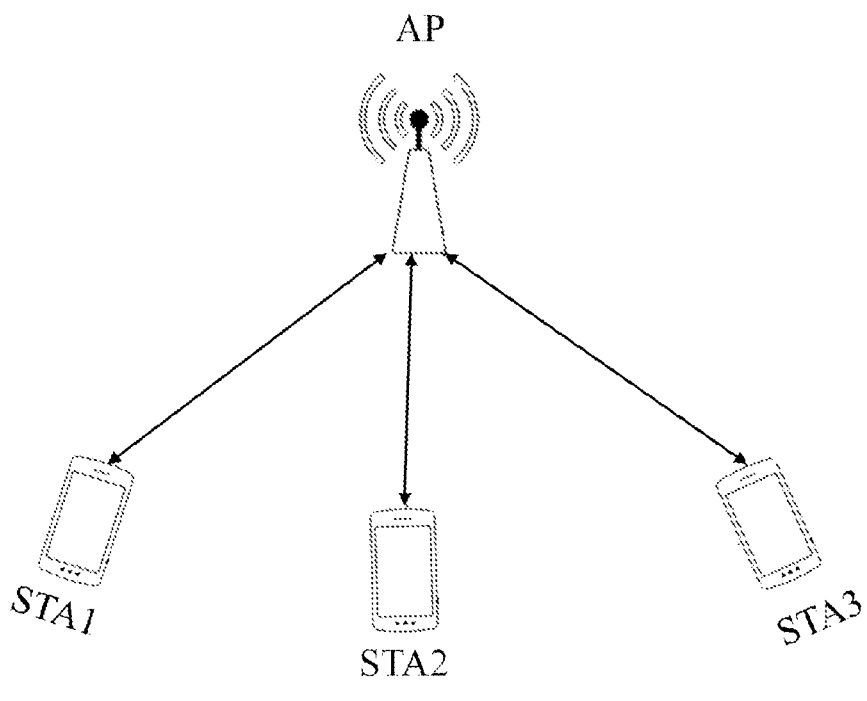
FIG. 1 is an exemplary diagram illustrating a wireless communication scenario.
Figure 2:
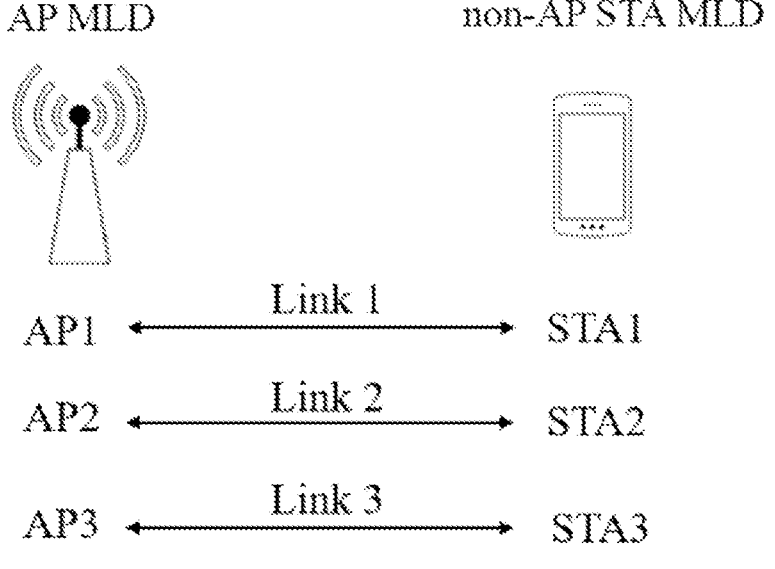
FIG. 2 is an exemplary diagram illustrating a communication scenario under multiple links.

FIG. 1 is an exemplary diagram illustrating a wireless communication scenario. FIG. 2 is an exemplary diagram illustrating a communication scenario under multiple links.

In a wireless local area network, a basic service set (BSS) can include an access point (AP) device and one or more non-AP devices (also referred to as station (STA) devices) that communicate with the AP device. A basic service set can be connected to a distribution system (DS) through its AP device, and then connected to another BSS to form an extended service set (ESS).

The AP device is a wireless switch used in a wireless network and is also a core of the wireless network. The AP device can be used as a wireless base station, which is mainly used as a bridge to connect a wireless network and a wired network. With this AP device, wired and wireless networks can be integrated.

As an example, the AP device can include software applications and/or circuits so that other types of nodes in the wireless network can communicate with the outside and inside of the wireless network through the AP device. For example, the AP device can be a terminal device or a network device equipped with a wireless fidelity (Wi-Fi) chip.

As an example, the station (STA) can include, but is not limited to, a cellular phone, a smart phone, a wearable device, a computer, a personal digital assistant (PDA), a personal communication system (PCS) device, a personal information manager (PIM), a personal navigation device (PND), a global positioning system, a multimedia device, an Internet of Things (IoT) device, etc.

Although it is shown in FIG. 1 that an AP device communicates with three station (STA) devices (STA 1, STA 2, STA3), this is only exemplary and the embodiments of the present disclosure are not limited to this. For example, there can be any number and/or any type of AP devices and STA devices.

As shown in FIG. 2, in an exemplary embodiment in the present disclosure, the AP device and the station (STA) device can be multi-link devices (MLDs), for example, the AP device and the STA device can be denoted as an AP MLD and a non-AP STA MLD, respectively. The AP MLD can represent an access point that supports a multi-link communication function, and the non-AP STA MLD can represent a station that supports the multi-link communication function. For example, there can be multiple links at different frequencies between the AP MLD and the non-AP STA MLD. For example only, the AP MLD can work under three links, for example, AP1, AP2, and AP3 as shown in FIG. 1, and the non-AP STA MLD can also work under three links, for example, AP1, AP2, and AP3 as shown in FIG. 1. In the example in FIG. 1, it is assumed that AP1 and STA1 communicate through a corresponding first link Link 1. Similarly, AP2 and AP3 communicate with STA2 and STA3 through a second link Link 2, and a third link Link 3, respectively. Link 1 to Link 3 can be multiple links at different frequencies, for example, links at 2.4 GHz, 5 GHZ, 6 GHZ, or several links with the same or different bandwidths at 2.4 GHz, 5 GHZ, 6 GHz. In addition, multiple channels can exist under each link. It should be understood that the communication scenario shown in FIG. 2 is only exemplary, and the concept of the present disclosure is not limited to this. For example, an AP MLD can be connected to multiple non-AP STA MLDs, or an AP can communicate with multiple other types of stations under each link. The communication method and communication apparatus according to the embodiments of the present disclosure can be applied to the communication between the AP MLD and the non-AP STA MLD, that is, can be applied to a multi-link communication environment.

In practical applications, the maximum working bandwidth that the AP MLD can support is different from that of some non-AP STA MLDs among non-AP STA MLDs that setup association links with the AP MLD. For example, the AP MLD may support a maximum working bandwidth of 320 MHz, and some non-AP STA MLDs setup association the AP MLD may only support a maximum working bandwidth of 160 MHz or 80 MHz, or smaller. That is, a physical (PHY) protocol data unit (PPDU) transmitted between the AP MLD and non-AP STA MLD has asymmetric working bandwidths. In this case, in order to make greater use of the capability of the AP MLD, aggregated physical (PHY) protocol data unit (A-PPDU) transmission can be performed. However, in existing technology, there is a lack of a mechanism on how to support A-PPDU transmission when the PPDU transmitted by the AP MLD and non-AP STA MLD has asymmetric working bandwidths.

Figure 3:
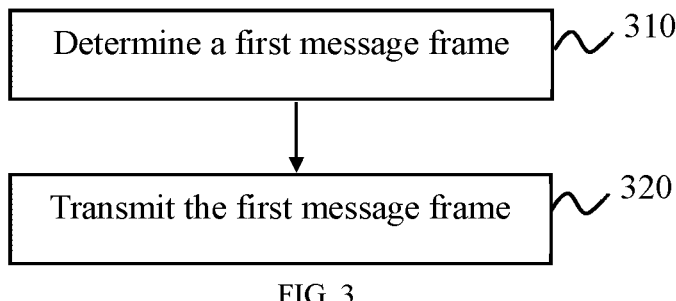
FIG. 3 is a flowchart illustrating a communication method according to an embodiment.

FIG. 3 is a flowchart illustrating a communication method according to an embodiment. The communication method shown in FIG. 3 can be applied to a transmitter. According to the embodiment of the present disclosure, the transmitter may be a device that supports multi-link communication, such as an AP MLD or a non-AP STA MLD. In a case where the transmitter is an AP MLD, the corresponding receiver can be a plurality of non-AP STA MLDs. In a case where the transmitter is a plurality of non-AP STA MLDs, the receiver can be an AP MLD. However, the present disclosure is not limited to this; for example, the transmitter and receiver need not both be devices that support multi-link communication. FIG. 3 includes steps 310 and 320.

Referring to FIG. 3, in step 310, a first message frame can be determined, where the first message frame can include information for identifying a support capability for transmitting and/or receiving an A-PPDU (hereinafter referred to as "A-PPDU support capability information").

In an example of the present disclosure, in the case where the transmitter is an AP MLD, the first message frame may be a frame determined by the AP MLD in multi-link setup, for example, a beacon frame, a probe response frame, an association response frame, or a re-association response frame. In another example of the present disclosure, in the case where the transmitter is a non-AP STA MLD, the first message frame may be a frame determined by the non-AP STA MLD in multi-link setup, for example, a probe request frame, an association request frame, or a re-association request frame. It will be understood that the types of the frame shown herein are only exemplary, and the first message frame is not limited to this, but can be any other type of data frame, management frame, or control frame.

In an example of the present disclosure, there are many ways to determine the first message frame, for example, the first message frame can be generated based on at least one of the following conditions: channel status, network condition, load condition, hardware capability of transmitting/receiving device, service type, and relevant protocol provision. There are no specific restrictions on this in the embodiment of the present disclosure. In an example of the present disclosure, the first message frame can also be obtained from an external device, and there are no specific restrictions on this in the embodiment of the present disclosure.

According to the embodiment in the present disclosure, in the initial association process (e.g., multi-link setup process), the AP MLD or the non-AP STA MLD can identify the support capability for transmitting and receiving an A-PPDU, or identify the support capability for receiving or transmitting an A-PPDU. For example, the support capability for receiving and/or transmitting an A-PPDU can be carried through a capability information element. For example, A-PPDU support capability information in the first message frame can be included in an extremely high throughput (EHT) PHY capability information element or an EHT media access control (MAC) capability information element. However, the present disclosure is not limited to this, and other forms of capability information elements are also feasible.

In an example, the A-PPDU support capability information can refer to the support capability of the transmitter for transmitting and receiving an A-PPDU. For example, the support capability of the transmitter for transmitting and receiving an A-PPDU can be identified by a sub-field in a capability information element, as shown in Table 1 below.

TABLE 1

| A-PPDU Supported |
| --- |

As an example, when the sub-field (A-PPDU Supported in Table 1) is set to a specific value, it can be identified that the transmitter supports the transmitting and receiving of an A-PPDU; when the sub-field (A-PPDU Supported in Table 1) is set to another specific value, it can be identified that the transmitter does not support the transmitting and receiving of an A-PPDU. For example, but not limited to, the A-PPDU Supported in Table 1 can have a bit, that is, a capability information value that supports receiving and transmitting an A-PPDU can be identified by a bit.

In another example, the A-PPDU support capability information can refer to the support capability for receiving or transmitting an A-PPDU. For example, the support capability of the transmitter for transmitting or receiving an A-PPDU can be identified by two sub-fields in a capability information element, as shown in Table 2 below.

TABLE 2

| A-PPDU Tx Supported | A-PPDU Rx Supported |
| --- | --- |

Specifically, a sub-field (A-PPDU Tx Supported in Table 2) can identify the support capability of the transmitter for transmitting an A-PPDU, and another sub-field (A-PPDU Rx Supported in Table 2) can identify the support capability of the transmitter for receiving an A-PPDU. When the sub-field A-PPDU Tx Supported is set to a specific value, it can be identified that the transmitter supports the transmitting of an A-PPDU; when the sub-field is set to another specific value or omitted, it can be identified that the transmitter does not support the transmitting of an A-PPDU. When another sub-field (A-PPDU Rx Supported in Table 2) is set to a specific value, it can be identified that the transmitter supports the receiving of an A-PPDU; when the sub-field is set to another specific value or omitted, it can be identified that the transmitter does not support the receiving of an A-PPDU. For example, but not limited to, both A-PPDU Tx Supported and A-PPDU Rx Supported in Table 2 can have one bit, that is, the capability information value that supports receiving or transmitting an A-PPDU can be identified by two bits.

According to the example in the present disclosure, in the initial association process, the AP MLD or the non-AP STA MLD can identify its capability information value that supports transmitting and receiving an A-PPDU, or identify its capability information value that supports receiving or transmitting an A-PPDU. Specifically, the capability information value can be included in the EHT PHY capability information element or the EHT MAC capability information element, and can be identified with one bit or two bits. In another example of the present disclosure, the A-PPDU support capability information can be included in a multi-link (ML) information element, specifically in a common information field of the ML information element.

Continuing with reference to FIG. 3, in step 320, the first message frame can be transmitted. For example, the first message frame can be transmitted to the receiver through any of multiple links, so that the receiver can obtain the A-PPDU support capability information of the transmitter.

In addition, the transmitter can also receive another message frame from the receiver, which can carry the A-PPDU support capability information of the receiver (as shown in Tables 1 and 2 above), so that the transmitter can also obtain the A-PPDU support capability information of the receiver.

If the transmitter and the receiver know each other's A-PPDU support capability information, an effective A-PPDU transmission can be carried out.

The case where both the transmitter and the receiver can support the transmitting and receiving of an A-PPDU will be described as below. According to the embodiment of the present disclosure, when the A-PPDU transmission is performed, a bandwidth (BW) of transmitting a downlink (DL) A-PPDU and a BW of transmitting an uplink (UL) A-PPDU can be identified. In an example of the present disclosure, the identification method of the bandwidth can be determined based on the type of devices of performing DL A-PPDU transmission and UL A-PPDU transmission.

In an example, the transmitter can be an access point, which can transmit a downlink PPDU to at least two stations respectively. According to this example, in a case where the DL A-PPDU transmission is performed, and the DL A-PPDU includes at least two downlink PPDUs, the bandwidth of the DL A-PPDU can be identified as a maximum working bandwidth covered by all the at least two downlink PPDUs. In this case, the device that transmits the DL A-PPDU (for example, an access point) and devices that receive the at least two downlink PPDUs (for example, the at least two stations) are both devices that support extremely high throughput communication. That is, only EHT devices are included in the DL A-PPDU transmission.

For example, it is assumed that the AP MLD can support a maximum working bandwidth of 320 MHz, and some non-AP STA MLDs associated with the AP MLD only support a maximum working bandwidth of 160 MHz or 80 MHz. When the downlink transmission is performed, for example, but not limited to, the DL A-PPDU can be composed of three downlink PPDUs, where the working bandwidth of two downlink PPDUs is 80 MHz, and the other is 160 MHz. Therefore, the DL A-PPDU can be set to the maximum working bandwidth covered by the three downlink PPDUs, 320 MHz.

According to another example of the present disclosure, in a case where the DL A-PPDU transmission is performed, and the DL A-PPDU includes at least two downlink PPDUs, the bandwidths of the at least two downlink PPDUs can be identified respectively. In this case, there are one or more stations supporting high-efficiency (HE) communication among stations receiving the at least two downlink PPDUs. However, the present disclosure is not limited to this. For example, in the case of identifying the bandwidth of the DL A-PPDU separately, the device that transmits the DL A-PPDU (for example, an access point) and devices that receive the at least two downlink PPDUs (for example, the at least two stations) are both devices that support extremely high throughput communication. For example, but not limited to, the DL A-PPDU can be composed of three downlink PPDUs, where the working bandwidth of two downlink PPDUs is 80 MHz, and that of the other is 160 MHz. Therefore, three working bandwidths, namely 80 MHz, 80 MHz, and 160 MHz, can be identified in a DL A-PPDU signaling field.

In an example of the present disclosure, the bandwidth of the DL A-PPDU can be identified in a signaling field of PPDUs to be transmitted (for example, U-SIG or SIG-A).

In another example of the present disclosure, the transmitter can be at least two stations, both of which can transmit an uplink PPDU to the access point. According to this example, in a case where UP A-PPDU transmission is performed, and the UL A-PPDU includes at least two uplink PPDUs, the bandwidths of the at least two uplink PPDUs are identified respectively. In uplink transmission, a plurality of stations can transmit a PPDU to the access point respectively, so each station can identify the bandwidth of the PPDU to be transmitted by the station itself. In this case, there can be one or more stations supporting high-efficiency (HE) communication among stations transmitting the at least two downlink PPDUs. However, the present disclosure is not limited to this. For example, in the case of identifying the bandwidth of the UL A-PPDU separately, the devices that transmit the at least two uplink PPDUs (for example, the at least two stations) and the device that receives the UL A-PPDU (for example, the access point) can both be devices that support extremely high throughput communication.

In an example of the present disclosure, the bandwidth of the UL A-PPDU can be identified in a signaling field of PPDUs to be transmitted (for example, U-SIG or SIG-A).

According to the embodiment of the present disclosure, if only EHT devices are included in the transmission of an A-PPDU, the BW of the A-PPDU can be set to the maximum working bandwidth covered by the A-PPDU in the case of DL. For example, but not limited to, if the A-PPDU is composed of three PPDUs, where the working bandwidth of two downlink PPDUs is 80 MHz and that of the other is 160 MHz, the BW of the A-PPDU is set to 320 MHz. However, the present disclosure is not limited to this. For example, three different BW identifiers can also be set respectively. In the case of UL, the bandwidth of each PPDU can be set individually. If a HE STA is included in the transmission of an A-PPDU, in the cases of DL and UL, the bandwidth of each PPDU can be set respectively.

According to the embodiment of the present disclosure, by identifying corresponding bandwidths in the transmission of DL A-PPDU and UL A-PPDU, the capacity of the device (e.g., AP) can be maximized, and the throughput of the system can be improved. The technical solution provided by the embodiment of the present disclosure can also improve spectrum utilization.

Figure 4:
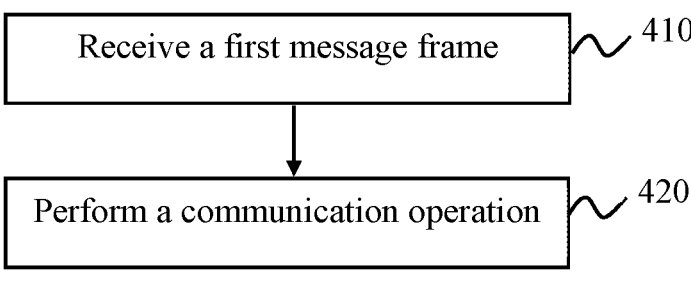
FIG. 4 is a flowchart illustrating another communication method according to an embodiment.

FIG. 4 is a flowchart illustrating another communication method according to an embodiment. The communication method shown in FIG. 4 can be applied to a receiver. According to the embodiment of the present disclosure, the receiver may be a device that supports multi-link communication, such as a non-AP STA MLD or an AP MLD. The receiver can be a plurality of non-AP STA MLDs, in which case the corresponding transmitter is an AP MLD. The receiver can be an AP MLD, in which case the transmitter is a plurality of non-AP STA MLDs. However, the present disclosure is not limited to this; for example, the transmitter and receiver need not both be devices that support multi-link communication. FIG. 4 includes steps 410 and 420.

Referring to FIG. 4, in step 410, a first message frame is received, where the first message frame can include information for identifying a support capability for transmitting and/or receiving an A-PPDU. That is, the receiver can obtain the support capability of the transmitter for the transmission of an A-PPDU (i.e., the transmission of an A-PPDU can refer to transmitting and/or receiving an A-PPDU) from the first message frame. A-PPDU support capability information in the first message frame can be included in an extremely high throughput (EHT) PHY capability information element or an EHT media access control (MAC) capability information element. In addition, as shown in Tables 1 and 2, one sub-field or two sub-fields can be used to identify the A-PPDU support capability information. The embodiments of the A-PPDU support capability information can be similar to those described with reference to Tables 1 and 2. For simplicity, repeated descriptions are omitted herein.

In step 420, a communication operation is performed based on the first message frame. For example, the receiver can obtain the A-PPDU support capability information according to the first message frame from the transmitter. If the A-PPDU support capability information in the first message frame indicates that transmitting and receiving of an A-PPDU are supported, A-PPDU transmission can be carried out in future data interactions. In addition, the receiver can also transmit another message frame to the transmitter, which can carry the A-PPDU support capability information of the receiver (as shown in Tables 1 and 2 above), so that the transmitter can obtain the A-PPDU support capability information of the receiver.

In the case where both the receiver and the transmitter can support the A-PPDU, when the A-PPDU transmission is performed, a bandwidth (BW) of transmitting a downlink (DL) A-PPDU and a BW of transmitting an uplink (UL) A-PPDU can be identified. In an example of the present disclosure, the identification method of the bandwidth can be determined based on the type of devices performing DL A-PPDU transmission and UL A-PPDU transmission.

In an example of the present disclosure, the receiver may be at least two stations, which respectively receive a downlink PPDU from the access point. According to this example, for example, in a case where the DL A-PPDU transmission is performed, and the DL A-PPDU includes at least two downlink PPDUs, the bandwidth of the DL A-PPDU can be identified as a maximum working bandwidth covered by all the at least two downlink PPDUs. In this case, the device that transmits the DL A-PPDU and devices that receive the at least two downlink PPDUs are both devices that support extremely high throughput (EHT) communication.

According to another example, in a case where the DL A-PPDU transmission is performed, and the DL A-PPDU includes at least two downlink PPDUs, the bandwidths of the at least two downlink PPDUs can be identified respectively. In this case, there can be one or more stations supporting high-efficiency (HE) communication (HE STAs) among stations receiving the at least two downlink PPDUs. However, the present disclosure is not limited to this. For example, the device that transmits the DL A-PPDU and devices that receive the at least two downlink PPDUs are both devices that support extremely high throughput (EHT) communication.

In an example of the present disclosure, the bandwidth of the DL A-PPDU can be identified in a signaling field of PPDUs to be transmitted (for example, U-SIG or SIG-A).

In an example of the present disclosure, the receiver may be an access point that receives uplink PPDUs from at least two stations. According to this example, in a case where UP A-PPDU transmission is performed, and the UL A-PPDU includes at least two uplink PPDUs, the bandwidths of the at least two uplink PPDUs are identified respectively. In this case, there can be one or more stations supporting high-efficiency (HE) communication among stations transmitting the at least two downlink PPDUs. However, the present disclosure is not limited to this. For example, the devices that transmit the at least two uplink PPDUs and the device that receives the UL A-PPDU can both be devices that support extremely high throughput communication.

The identification method of the bandwidth of the DL A-PPDU and the UL A-PPDU can be similar to the embodiments described above with reference to FIG. 3, and duplicate descriptions are omitted herein to avoid redundancy.

The communication methods according to the embodiments of the present disclosure enable the device to receive an aggregated PPDU, the capacity of the device (e.g., AP) can be maximized, and the throughput of the system can be indirectly improved.

Figure 5:
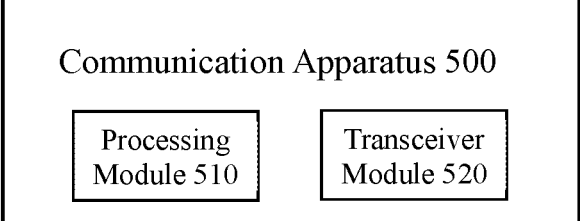
FIG. 5 is a block diagram illustrating a communication apparatus according to an embodiment.

FIG. 5 is a block diagram illustrating a communication apparatus 500 according to an embodiment. The communication apparatus 500 shown in FIG. 5 can be applied to a transmitter or a receiver. According to the embodiment of the present disclosure, the transmitter may be a device that supports multi-link communication, such as an AP MLD or a non-AP STA MLD, and the corresponding receiver may be a plurality of non-AP STA MLDs or AP MLDs. However, the present disclosure is not limited to this; for example, the transmitter and receiver need not both be devices that support multi-link communication, that is, the communication method shown in FIG. 5 can also be applied to devices that support single-link communication.

In the case where the communication apparatus 500 shown in FIG. 5 is applied to the transmitter, a processing module 510 can be configured to determine a first message frame, where the first message frame comprises information for identifying a support capability for transmitting and/or receiving an aggregated physical (PHY) protocol data unit (A-PPDU). A transceiver module 520 can be configured to transmit the first message frame. That is, in this case, the communication apparatus 500 can perform the communication method described with reference to FIG. 3, and the first message frame and the information included in the first message frame can be similar to the embodiments described with reference to step 310 of FIG. 3 and Tables 1 and 2. For simplicity, repeated descriptions are omitted herein.

In the case where the communication apparatus 500 shown in FIG. 5 is applied to the receiver, the transceiver module 520 can be configured to receive a first message frame, where the first message frame includes information for identifying a support capability for transmitting and/or receiving an aggregated physical (PHY) protocol data unit (A-PPDU); the processing module 510 can be configured to control, based on the first message frame, performing of a communication operation. That is, in this case, the communication apparatus 500 can perform the communication method described with reference to FIG. 4. For simplicity, repeated descriptions are omitted herein.

In addition, the communication apparatus 500 shown in FIG. 5 is only exemplary, and the embodiments of the present disclosure are not limited to this. For example, the communication apparatus 500 may also include other modules, such as memory modules, etc. In addition, the various modules in the communication apparatus 500 can be combined into more complex modules or divided into more individual modules.

The communication methods and communication apparatuses according to the embodiments of the present disclosure enable the device to receive an aggregated PPDU, the capacity of the device (e.g., AP) can be maximized, and the throughput of the system can be improved.

Based on the same principle as the methods provided in the embodiments of the present disclosure, the embodiments of the present disclosure also provide an electronic device, which includes a processor and a memory. The memory stores machine-readable instructions (also known as "a computer program"). The processor is configured to execute the machine-readable instructions to implement the methods described with reference to FIGS. 3 and 4.

An embodiment of the present disclosure also provides a computer-readable storage medium, on which a computer program is stored. When the computer program is executed by a processor, the methods described with reference to FIGS. 3 and 4 are implemented.

In an exemplary embodiment, the processor may be logic blocks, modules and circuits for implementing or performing various examples described in the present disclosure, for example, a central processing unit (CPU), a general-purpose processor, a digital signal processor (DSP), an application specific integrated circuit (ASIC), field programmable gate array (FPGA) or other programmable logic devices, transistor logic devices, hardware components or any combination thereof. The processor can also be a combination that realizes computing functions, for example, a combination of one or more microprocessors, a combination of DSP and microprocessors, etc.

In an exemplary embodiment, the memory can be, for example, a read only memory (ROM), a random access memory (RAM), an electrically erasable programmable read only memory (EEPROM), a compact disc read only memory (CD-ROM), or other optical disc storage, optical disk storage (including compact disk, laser disk, optical disk, digital versatile disk, Blu-ray disk, etc.), a magnetic disc storage medium or other magnetic storage device, or any other medium that can be used to carry or store program codes in the form of instructions or data structures and can be accessed by a computer, but is not limited to this It is to be understood that although the steps in the flowchart of the accompanying drawings are shown in sequence as indicated by arrows, these steps are not necessarily executed in sequence as indicated by the arrows. Unless clearly indicated in the context otherwise, the sequence of execution of these steps is not strictly limited, and these steps can be executed in other sequences. In addition, at least part of the steps in the flowchart of the accompanying drawings may include a plurality of sub-steps or stages. These sub-steps or stages are not necessarily completed at the same moment, but can be executed at different moments, and these sub-steps or stages are not necessarily performed sequentially, but can be executed alternately or alternatively with other steps or at least part of the sub-steps or stages of the other steps.

Although the disclosure has been shown and described with reference to certain embodiments thereof, it will be understood by those skilled in the art that various changes in form and details can be made without departing from the scope of the disclosure. Therefore, the scope of the disclosure should not be limited to the embodiments, but should be defined by the appended claims and their equivalents.

The invention claimed is:

1. A communication method, comprising:
determining a first message frame, wherein the first message frame comprises information for identifying a support capability for at least one of transmitting and receiving an aggregated physical (PHY) protocol data unit (A-PPDU), and the information is comprised in an extremely high throughput PHY capability information element or an extremely high throughput media access control (MAC) capability information element; and
transmitting the first message frame, and
wherein the communication method further comprises:
determining an identification method of a bandwidth of a downlink (DL) A-PPDU or an uplink (UL) A-PPDU based on types of devices for performing a transmission of the DL A-PPDU or the UL A-PPDU.

2. The communication method according to claim 1, further comprising:
in response to performing a transmission of a downlink (DL) A-PPDU and the DL A-PPDU comprises at least two downlink PPDUs, identifying a bandwidth of the DL A-PPDU as a maximum working bandwidth covered by all of the at least two downlink PPDUs.

3. The communication method according to claim 2, wherein a device that transmits the DL A-PPDU and devices that receive the at least two downlink PPDUs are devices that support extremely high throughput communication.

4. The communication method according to claim 1, further comprising:
in response to performing a transmission of a downlink (DL) A-PPDU and the DL A-PPDU comprises at least two downlink PPDUs, identifying bandwidths of the at least two downlink PPDUs respectively.

5. The communication method according to claim 4, wherein there are one or more stations supporting high-efficiency (HE) communication among stations receiving the at least two downlink PPDUs.

6. The communication method according to claim 1, further comprising:
in response to performing a transmission of an uplink (UL) A-PPDU and the UL A-PPDU comprises at least two uplink PPDUs, identifying bandwidths of the at least two uplink PPDUs respectively.

7. A non-transitory computer readable storage medium storing a computer program, wherein the communication method according to claim 1 is implemented when the computer program is executed by a processor.

8. A communication method, comprising:
receiving a first message frame, wherein the first message frame comprises information for identifying a support capability for at least one of transmitting and receiving an aggregated physical (PHY) protocol data unit (A-PPDU), and the information is comprised in an extremely high throughput PHY capability information element or an extremely high throughput media access control (MAC) capability information element; and
performing a communication operation based on the first message frame;
wherein an identification method of a bandwidth of a downlink (DL) A-PPDU or an uplink (UL) A-PPDU is determined based on types of devices for performing a transmission of the DL A-PPDU or the UL A-PPDU.

9. The communication method according to claim 8, further comprising:
in response to performing a transmission of a downlink (DL) A-PPDU and the DL A-PPDU comprises at least two downlink PPDUs, identifying a bandwidth of the DL A-PPDU as a maximum working bandwidth covered by all of the at least two downlink PPDUs.

10. The communication method according to claim 9, wherein a device that transmits the DL A-PPDU and devices that receive the at least two downlink PPDUs are devices that support extremely high throughput communication.

11. The communication method according to claim 8, further comprising:
in response to performing a transmission of a downlink (DL) A-PPDU and the DL A-PPDU comprises at least two downlink PPDUs, identifying bandwidths of the at least two downlink PPDUs respectively.

12. The communication method according to claim 11, wherein there are one or more stations supporting high-efficiency (HE) communication among stations receiving the at least two downlink PPDUs.

13. The communication method according to claim 8, further comprising:
in response to performing a transmission of an uplink (UL) A-PPDU and the UL A-PPDU comprises at least two uplink PPDUs, identifying bandwidths of the at least two uplink PPDUs respectively.

14. An electronic device, comprising a memory, a processor, and a computer program stored in the memory and executable on the processor, wherein the processor is configured to execute the computer program to perform the communication method according to claim 8.

15. A non-transitory computer readable storage medium storing a computer program, wherein the communication method according to claim 8 is implemented when the computer program is executed by a processor.

16. An electronic device, comprising a memory, a processor, and a computer program stored in the memory and executable on the processor, wherein the processor is configured to execute the computer program to perform operations comprising:
determining a first message frame, wherein the first message frame comprises information for identifying a support capability for at least one of transmitting and receiving an aggregated physical (PHY) protocol data unit (A-PPDU), and the information is comprised in an extremely high throughput PHY capability information element or an extremely high throughput media access control (MAC) capability information element; and
transmitting the first message frame, and
wherein the processor is further configured to execute the computer program to perform:

determining an identification method of a bandwidth of a downlink (DL) A-PPDU or an uplink (UL) A-PPDU based on types of devices for performing a transmission of the DL A-PPDU or the UL A-PPDU.

17. The electronic device according to claim 16, wherein the processor is further configured to perform:

in response to performing a transmission of a downlink (DL) A-PPDU and the DL A-PPDU comprises at least two downlink PPDUs, identifying a bandwidth of the DL A-PPDU as a maximum working bandwidth covered by all of the at least two downlink PPDUs.

18. The electronic device according to claim 16, wherein the processor is further configured to perform:

in response to performing a transmission of a downlink (DL) A-PPDU and the DL A-PPDU comprises at least two downlink PPDUs, identifying bandwidths of the at least two downlink PPDUs respectively.

* * * * *